United States Patent [19]
Ammann

[11] 3,870,885
[45] Mar. 11, 1975

[54] DEVICE FOR MEASURING ABSORPTION

[75] Inventor: Ernst Ammann, Erlangen, Germany

[73] Assignee: Siemens Aktiengesellschaft, Munich, Germany

[22] Filed: Jan. 23, 1974

[21] Appl. No.: 435,825

[30] Foreign Application Priority Data
Feb. 7, 1973  Germany............................ 2306006

[52] U.S. Cl................. 250/360, 250/366, 250/369
[51] Int. Cl. ............................................ G01t 1/16
[58] Field of Search ........... 250/358, 360, 363, 366, 250/369

[56] References Cited
UNITED STATES PATENTS
3,432,657  3/1969  Slavin ............................ 250/360 X
3,808,440  4/1974  Petit-Clerc........................ 250/360

*Primary Examiner*—James W. Lawrence
*Assistant Examiner*—Davis L. Willis
*Attorney, Agent, or Firm*—Richards & Geier

[57] ABSTRACT

A device for absorption measurement by X-rays has a measuring device reached from an X-ray source and by a central ray of the X-rays, and consisting of a unit for ray intensity which, for the transillumination of an object at different directions, is rotatable about a point located in the central ray and movable perpendicularly to the central ray and to the axis of rotation. The unit has a calculator for determining absorption values of the intersecting points of the rays in the object from the intensity of rays received by the measuring device. The invention is particularly characterized by a second measuring device for the ray intensity, which is also struck by the central ray, and which is located in front of the object being illuminated in relation to the direction of the rays. The second measuring device is rotatable and movable jointly with the ray source and the first measuring device, and also can be connected to the calculator for determining the absorption values from the relations of ray intensities in front of and behind the object.

1 Claim, 2 Drawing Figures

DEVICE FOR MEASURING ABSORPTION

This invention pertains to a device for the absorption measurement by X-rays provided with a measuring device for the unit of ray intensity, which is struck from an X-ray source and a central ray of X-ray illumination. In order to provide transillumination of the object from different directions, the measuring device is rotatable about a point located in the central ray, and can be shifted perpendicularly to the central ray and to the axis of rotation. The device is also provided with a calculator determining absorption values of intersecting points of X-ray in the object from the intensity of rays received by the measuring device.

A device of this type is known through the prospectus "New EMI machine for diagnosing brain disease" as well as the publication "Computerized soft tissue tomography" by the firm EMI. In this device, which serves particularly for absorption measurement of the human head, the head is measured in cross sections, in that a unit consisting of an X-ray tube and a ray-measuring device feels the head in a certain plane perpendicularly to the central ray, whereupon the unit is turned by an angle and again shifted perpendicularly to the central ray and to the axis of rotation. This procedure is repeated until the unit has again reached its initial position. In this manner, a number of intersecting points of a matrix is determined. The results of the absorption measurement produced by the calculator can be reproduced in the form of an image matrix. Each point of the matrix then shows the absorption value of the corresponding point of the touched layer of the human head. In this manner, it is possible to draw conclusions about the distribution and limits of bone parts, fat parts, blood flow, blood curds, water, etc.

When using the known device, it is of importance that the ray intensity in front of the object shall be absolutely constant during the entire measuring procedure. When ray intensity is changed in front of the patient, the calculator produces erroneous calculations, since an absorption change appears in the calculator which is actually not present. Errors can already be produced by superposition of an alternating voltage over the X-ray tube voltage. In prior art, in order to keep constant the ray intensity in front of the object, it is necessary to have a complicated and expensive device for intensity regulation.

An object of the present invention is the provision of a device of the described type, wherein requirements for keeping constant ray intensity are considerably less than those in prior art, so that the complicated means for intensity regulation can be eliminated.

In the accomplishment of the objectives of the present invention, it was found desirable to provide a second measuring device for the ray intensity, which is also struck by the central ray, and which is located in front of the object being examined in relation to the direction of the rays. The second measuring device is rotatable and movable jointly with the ray source and the first measuring device, and is also connected with the calculator for determining absorption values from the relations of ray intensities in front of and behind the object.

Thus, in accordance with the present invention, the ray intensity is measured in front of and behind the object. From this ratio, the calculator determines the absorption values of the individual points of the illuminated layer of the object. Small intensity variations, resulting from the dose output variations in the X-ray tube, do not produce any erroneous calculations, since there is no change in the ratio of the intensities before and behind the patient. Thus, in the device of the present invention, it is not necessary to keep extremely constant the ray intensity in front of the object. It is sufficient if the ray intensity is approximately constant. The approximate constancy keeping requires a substantially smaller technical switch arrangment. For keeping the ray intensity approximately constant, it is possible to use devices known in X-ray technology.

The invention will appear more clearly from the following detailed description when taken in connection with the accompanying drawings, showing, by way of example only, a preferred embodiment of the inventive idea.

Figure 1:
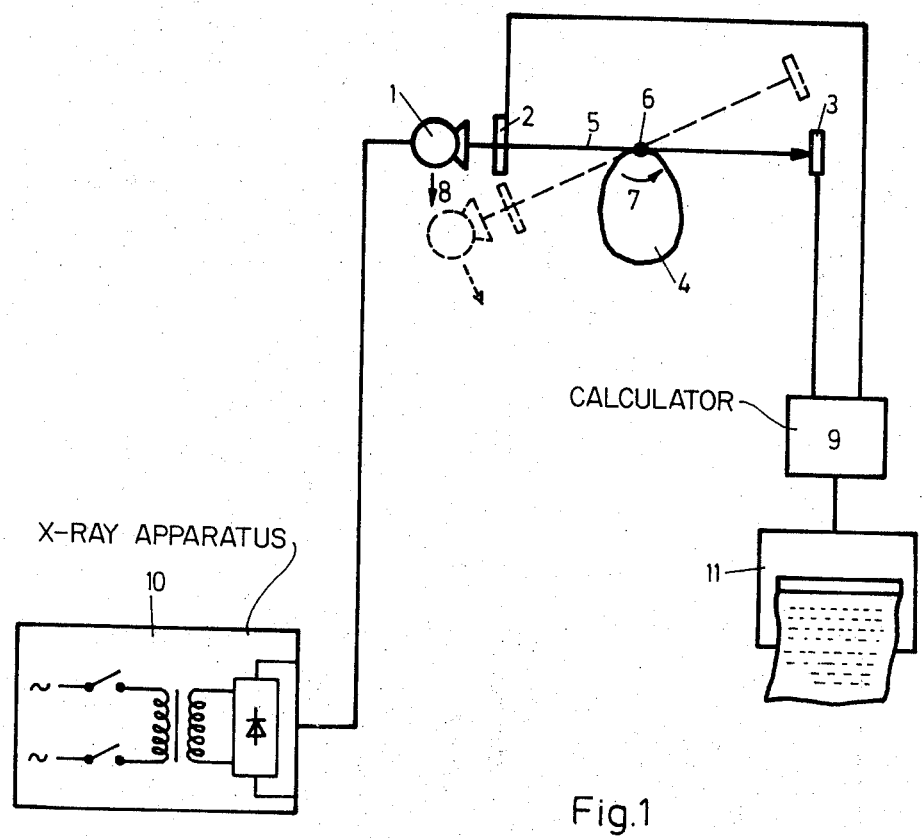
FIG. 1 is a circuit view of a device of the present invention.

The drawings show only those parts which are important for the consideration of the present invention.

The drawings show a unit consisting of an X-ray tube 1 and two measuring devices 2 and 3, which makes possible a ray penetration of a predetermined layer of an object, for example, the head 4 of a patient, by means of a sharply bundled X-ray bundle. The unit 1, 2, 3 is rotatable in the direction of an arrow 7 around a point 6 located in the central ray 5. The unit 1, 2, 3 is also movable in the direction of the arrow 8 perpendicularly to the central ray 5. The ray-measuring devices 2 and 3 transmit signals corresponding to the measured ray intensity to a calculator 9.

The illustrated device makes it possible to calculate, matrix-like by the calculator 9, the absorption of the X-rays through the head 4 in the illuminated layers. For that purpose, the unit 1, 2, 3 in the illustrated extracted position is shifted initially in the direction of the arrow 8 until the entire layer of the head 4 has been felt. Thereupon, the unit 1, 2, 3 is again moved back into the position shown by full lines, and then is rotated in the direction of the arrow 7 by a predetermined amount. Then, the shifting procedure is repeated. This shifting is again followed by a rotation. Thus, the locations of the unit 1, 2, 3 represented by full and broken lines follow each other alternately until the unit 1, 2 3 has again reached its initial position shown in full lines in the drawings. From signals delivered by the measuring devices 2 and 3, the calculator 9 determines the absorption of a plurality of points of the measured layer of the head 4 which correspond to the intersecting points of the rays. The values determined by the calculator can be printed in the shape of a matrix by a connected printer 11. From these values, information can be obtained about the substance distribution in the head 4.

The drawing shows diagrammatically an X-ray apparatus 10 feeding the X-ray tube 1. This X-ray apparatus can be of the usual construction, wherein the ray intensity of the X-ray tube 1 is approximately constant. A precisely constant ray intensity is not required, since the ratio of the signals supplied by the measuring devices 2 and 3 and determined by the calculator 9, is not changed by small variations of ray intensity. Thus, in the device of the present invention, it is sufficient if the X-ray tube voltage is approximately constant.

The present invention has been described in connection with the feeling of a specific layer of a human head. However, in accordance with the present invention, it is also possible to carry out an examination of other body layers. Of importance is that the object being examined should not change its position relatively to the X-rays during the entire examination.

Figure 2:
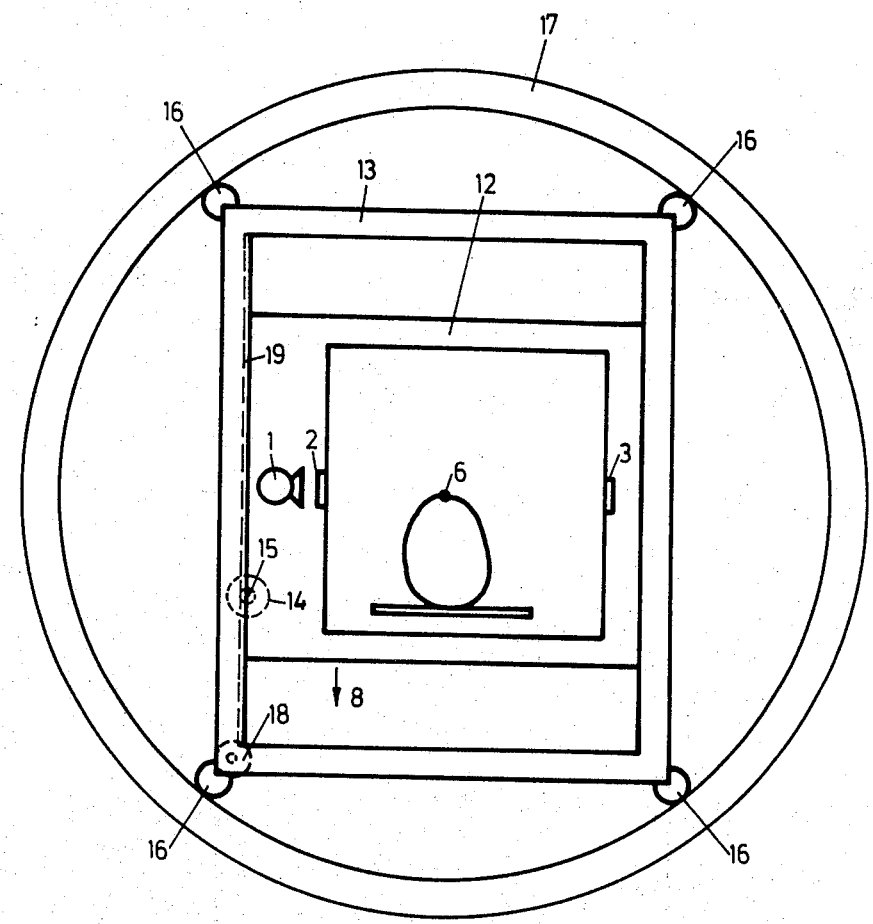
FIG. 2 shows the mechanical structure of the device of FIG. 1.

FIG. 2 shows that the X-ray tube 1 and the ray-measuring devices 2 and 3 are fixed upon a frame 12, which is mounted in a frame 13 so as to be shiftable in the direction of the arrow 8. For this movement serves an electric motor 14, which engages by a pinion 15 gears 19 upon one side of the frame 13. The rotation of the frame 12 with the X-ray tube 1 and the measuring devices 2 and 3 about the point 6 is made possible by rotatably guiding the frame 13 by four rollers 16 in a ring support 17. The rotation takes place by an electric motor 18, which can drive the roller 16 connected therewith. Switches can be connected with the motors 14 and 18, which are preferably actuated automatically by a program operating device in such manner that the described sequence of the rotation and shiftings of the unit 1, 2, 3 can take place. However, this is not vital for the present invention. According to the present invention, a manual switching of the motors 14 and 18 is also possible.

The device shown in FIG. 2 makes it possible to determine, in a specific layer of the object being illuminated, the absorption values by forming quotients of the ray intensities measured by measuring devices 2 and 3. Thus, the calculator 9 is basically a quotient producer.

I claim:

1. A device for absorption measurements by X-rays, comprising, in combination with a source of X-rays producing a central ray, two measuring devices adapted to be located on opposite sides of the object being measured for measuring ray intensity, said devices being located in the path of said central ray, means connected with said source and said two measuring devices for jointly rotating them about a point located in the path of said central ray and for jointly shifting them in directions perpendicular to said central ray and to their axis of rotation, and a computer connected with said two measuring devices for determining absorption values from the ratios of the signals delivered by said measuring devices.

* * * * *